United States Patent Office 3,732,341
Patented May 8, 1973

3,732,341
(ALKYL AND O-ALKYLOXY ALKYL)-O-ALKYL-S-(1,2,2 - TRICHLORO-ETHYL)-THIONOTHIOL PHOSPHORIC AND PHOSPHONIC ACID ESTERS
Wilhelm Sirrenberg, Sprockhovel, Ingeborg Hammann, Cologne, and Bernhard Homeyer, Opladen, Germany, assignors to Farbenfabriken Bayer Aktiengesellschaft, Leverkusen, Germany
No Drawing. Filed Jan. 30, 1970, Ser. No. 7,263
Claims priority, application Germany, Feb. 4, 1969, P 19 05 356.6
Int. Cl. C07f 9/08; A01n 9/36
U.S. Cl. 260—950                         6 Claims

ABSTRACT OF THE DISCLOSURE (Alkyl and O-alkyl)-O-alkyl-S-(1,2,2-trichloroethyl)-thionothiol phosphoric and phosponic acid esters, i.e. (alkyl, O-alkyl and O-alkoxy-alkyl)-O-(alkyl and alkoxy-alkyl)-S-(1,2,2 - trichloro-ethyl) - thionothiol phosphoric and phosphonic acid esters, which possess arthorpodicidal, especially insecticidal and acaricidal, properties, and which may be produced by conventional methods.

---

The present invention relates to and has for its objects the provision for particular new (alkyl and O-alkyl)-O-alkyl - S - (1,2,2 - trichloro - ethyl) - thionothiol phosphoric and phosphonic acid esters, i.e. (alkyl, O-alkyl and O-alkoxy-alkyl) - O - (alkykl and alkoxy-alkyl)-S-(1,2,2 - trichloro - ethyl) - thionothiol phosphoric and phosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g. arthropods, especially insects and acarids, and particularly soil insects, with other and further objects becoming apparent from a study of the within specification and accompanying examples.

It is known, inter alia, that the compound O,O-diisopropyl - S - (2,2,2 - trichloro - ethyl) - thiol phosphoric acid ester (A) has insecticidal properties.

It is also known from German Published Pat. (DAS) 1,134,241 that O,O - diethyl - O - (2,4 - dichloro-phenyl)-thiono-phosphoric acid ester of the formula

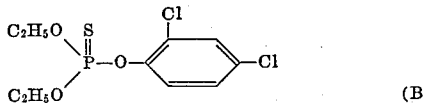

(B)

can be used for the control of soil insects. In order that a satisfactory effect should be attained, however, the addition of methyl isothiocyanate is necessary. Methyl isothiocyanate is an unpleasant, aggresive substance. The possibility of a widespread use of the compound of the Formula B above is considerably restricted by this fact. In addition, these synergistic mixtures must be used in much greater concentrations to give the same activity against soil insects as for instance the compounds according to the present invention as noted below.

It is furthermore known from German Published Pat. (DAS) 1,156,274 that thionophosphoric acid esters of the general formula

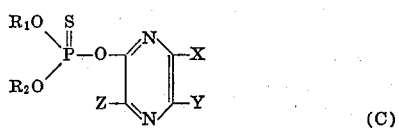

(C)

in which
R₁ and R₂ are lower alkyl (for example methyl, ethyl, propyl, isopropyl or butyl) and
X, Y and Z are hydrogen, halogen, lower alkyl or phenyl can be used for the control of insects in soil. These known compounds of Formula C have the disadvantage, however, that they only act against soil insects in considerably higher concentration than the compounds according to the present invention as noted below.

It is also known from U.S. Pat. 3,250,828 that O,O-dimethyl - S - (1,2,2 - trichloro - ethyl) - thiolphosphoric acid ester of the formula

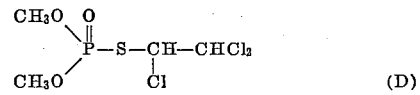

(D)

possesses a comprehensive activity as bactericide, fungicide and insecticide. This comprehensive activity renders in many cases the use of the compound impossible, since, because of its low selective activity, there are affected also those insects, bacteria and fungi whose preservation is desirable for reasons of biological equilibrium, i.e. for ecological balance. The compound of Formula D, too, only shows a satisfactory activity at higher concentrations than the compounds according to the present invention as noted below.

It has now been found, in accordance with the present invention, that the particular new phosphorus acid esters, i.e. O,O - dialkyl - S - (1,2,2 - trichloro - ethyl) - thiono-thiol phosphoric acid esters and O - alkyl - S - (1,2,2-trichloro - ethyl) - alkane - thionothiol phosphonic acid esters, of the formula

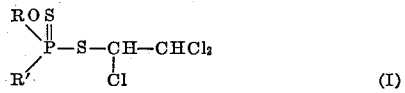

(I)

in which
R is selected from the group consisting of alkyl of 1–5 carbon atoms and alkoxyalkyl of 2–6 carbon atoms, and
R' is selected from the group consisting of alkyl of 1–4 carbon atoms, alkoxy of 1–5 carbon atoms and alkoxy-alkoxy of 2–6 carbon atoms, exhibit strong arthropodicidal, especially insecticidal and acaricidal, and particularly soil-insecticidal, properties.

It has been furthermore found, in accordance with the present invention, that the particular new compounds of Formula I above may be produced by a process which comprises reacting a thiophosphorous or thiophosphonous acid alkyl ester of the formula

(II)

in which
R and R' are the same as defined above, optionally in the presence of an acid-binding agent, with a 1, 2,2-trichloro-ethane-sulfenic acid halide of the formula

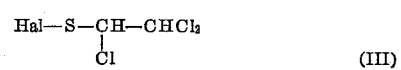

(III)

in which

Hal is a halogen atom such as chloro or bromo, especially chloro.

Surprisingly, the particular new compounds of Formula I above according to the present invention show considerably higher insecticidal and acaricidal, and especially soil-insecticidal, activity than the previously known compounds of analogous constitution and the same type of activity, such as compounds (A) to (D) noted above. Furthermore, the instant active compounds do not possess any of the above-mentioned disadvantages of such known types of compounds (A) to (D). The compounds of the present invention therefore represent a valuable contribution to the art.

Where, for instance, thiophosphorous acid O,O-dimethyl ester and 1,2,2-trichloroethanesulfenic acid chloride are used as starting materials, the production reaction can be represented by the following formula scheme:

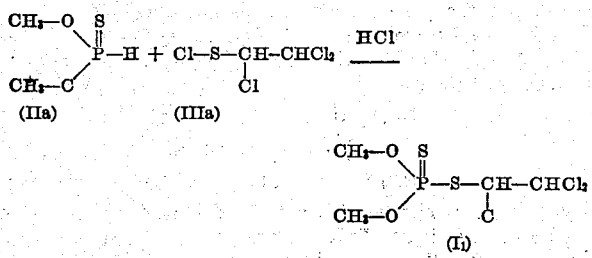

The thiophosphorous acid O,O-dialkyl esters and alkane-thiophosphonous acid O-alkyl esters which may be used as starting materials are clearly characterized by Formulae II and III noted above.

Advantageously, in accordance with the present invention, in the various formulae herein:

R represents:

straight and branched chain lower alkylhydrocarbon of 1–5 carbon atoms such as methyl, ethyl, n- and iso-propyl, n1, iso-, sec.- and tert.-butyl, n- and iso-amyl, and the like, especially $C_{1-4}$ or $C_{1-3}$ or $C_{1-2}$ alkyl; or alkoxyalkyl of 2–6 carbon atoms such as methoxy, ethoxy, n- and iso-propoxy, n-, iso-, sec.-and tert.-butoxy, and the like, -substituted methyl to tert.-butyl inclusive as defined above, and the like, i.e. having a total of 2–6 or 2–5 or 2–4 or 2–3 carbon atoms, and especially $C_{1-2}$ alkoxy-$C_{1-4}$ or $C_{1-3}$ or $C_{1-2}$ alkyl; and R' represents:

straight and branched chain lower alkyl hydrocarbon of 1–4 carbon atoms such as methyl to tert.-butyl inclusive as defined above, and the like, and especially $C_{1-3}$ or $C_{1-2}$ alkyl;
straight and branched chain alkoxy of 1–5 carbon atoms such as methoxy, ethoxy, n- and iso-propoxy, n-, iso-, sec.- and tert.-butoxy, n- and iso-amyloxy, and the like, especially $C_{1-4}$ or $C_{1-3}$ or $C_{1-2}$ alkoxy; or alkoxyalkoxy of 2–6 carbon atoms such as methoxy to tert.-butoxy inclusive as defined above, and the like, -substituted methoxy to tert.-butoxy inclusive as defined above, and the like, especially $C_{1-2}$ alkoxy-$C_{1-4}$ or $C_{1-3}$ or $C_{1-2}$ alkoxy.

Preferably, R is $C_{1-4}$ or $C_{1-3}$ or $C_{1-2}$ alkyl; or $C_{1-2}$ alkoxy-$C_{1-4}$ or $C_{1-3}$ or $C_{1-2}$ alkyl; and R' is $C_{1-3}$ or $C_{1-2}$ alkyl; or $C_{1-4}$ or $C_{1-3}$ or $C_{1-2}$ alkoxy; or $C_{1-2}$ alkoxy-$C_{1-4}$ or $C_{1-3}$ or $C_{1-2}$ alkoxy.

In particular, R is $C_{1-3}$ or $C_{1-2}$ alkyl; or $C_{1-2}$ alkoxy-$C_{1-3}$ or $C_{1-2}$ alkyl; and R' is $C_{1-2}$ alkyl; or $C_{1-3}$ or $C_{1-2}$ alkoxy; or $C_{1-2}$ alkoxy-$C_{1-3}$ or $C_{1-2}$ alkoxy.

As typical examples of thiophosphorous acid O,O-diesters which can be used according to the present invention, there are listed the following:

thiophosphorous acid-O,O-di-methyl ester,
thiophosphorous acid-O,O-di-ethyl-ester,
thiophosphorous acid-O,O-bis-(2-chloro-ethyl) ester,
thiophosphorous acid-O,O-di-n-propyl ester,
thiophosphorous acid-O,O-di-iso-propyl ester,
thiophosphorous acid-O,O-di-n-butyl ester,
thiophosphorous acid-O,O-di-iso-butyl ester,
thiophosphorous acid-O,O-di-n-pentyl ester,
thiophosphorous acid-O,O-bis-(2-methyl-butyl) ester,
thiophosphorous acid-O,O-bis-(3-methyl-butyl) ester,
thiophosphorous acid-O-methyl-O-ethyl-ester,
thiophosphorous acid-O-methyl-O-n-propyl ester,
thiophosphorous acid-O-methyl-O-iso-propyl ester,
thiophosphorous acid-O-ethyl-O-n-propyl ester,
thiophosphorous acid-O-ethyl-O-iso-propyl ester,
thiophosphorous acid-O,O-bis-(2-methoxy-ethyl) ester,
thiophosphoric acid-O,O-bis-(2-ethoxy-ethyl) ester.

As typical examples of thiophosphonous acid O-alkyl esters which can be used according to the present invention, the following are listed:

methane-thiophosphonous acid-O-methyl ester,
methane-thiophosphonous acid-O-ethyl ester,
methane-thiophosphonus acid-O-iso-propyl ester,
methane-thiophosphonous acid-O-n-propyl ester,
chloromethane-thiophosphonous acid-O-ethyl ester,
ethane-thiophosphonous acid-O-methyl ester,
ethane-thiophosphonous acid-O-ethyl ester,
ethane-thiophosphonous acid-O-n-propyl ester,
ethane-thiophosphonous acid-iso-propyl ester.

The starting compounds of Formula II above are known [cf. Chem. Abstracts 54, 243391i (1960), J. Chem. Soc. (London), 1960, 881 and DAS (German published specification( 1,115,248]. The same is true of the starting sulfenic acid halides of Formula III above.

The production reaction may be carried out in the presence of a solvent (this term includes a mere diluent). For example, inert organic solvents are suitable. Preferred solvents include optionally chlorinated hydrocarbons, such as benzene, toluene, petroleum ether, ligroin, chloroform, methylene chloride, carbon tetrachloride, and the like.

With favorable cooling, the reaction can also be carried out without a solvent.

Acid-binders, i.e. conventional acid binding agents, may be used, but are not absolutely necessary. The hydrochloric acid formed in the reaction can also be removed under slightly reduced pressure or by blowing inert carrier gases, e.g. air, through the reaction solution.

The reaction temperature can be varied within a fairly wide range. In general, the reaction is carried out at substantially between about $-10$ to $+50°$ C., and preferably between about 0 to 20° C.

The reaction can be carried out under normal pressure. It may, however, be carried out under somewhat reduced pressure in order to remove the hydrochloric acid gas which is formed. In another method of working, it suffices to remove the hydrochloric acid gas by blowing in an inert carrier gas. Suitable carrier gases include dry air, dry nitrogen and dry carbonic acid. It is also possible to pass an inert carrier gas through the reaction solution at reduced pressure for a combined removal effect.

A specific embodiment of the production process is particularly described as follows:

The thiophosphorous acid O,O-dialkyl ester or alkanethiophosphonous acid O-alkyl ester is dissolved in a 2- to 5-fold amount of solvent, and the solution is cooled to 0° C.; dry inert gas is passed through the solution under a pressure of 200 to 600 mm. Hg; 0.8 to 1 mol of 1,2,2-trichloro-ethyl-sulfenic acid halide per mol of ester, dissolved in a 1- to 5-fold amount of solvent (preferably carbon tetrachloride), is added dropwise to the solution; cooling of the exothermic reaction is effected; the red solution of 1,2,2-trichloro-ethyl-sulfenic acid halide being added dropwise is immediately decolorized; after addition of the sulfenic acid halide, the reaction solution is heated to 20 to 25° C. and stirring is continued for a short time; the reaction solution is then washed acid-free with dilute solution of sodium bicarbonate; and the solution is dried over sodium sulfate.

After removal of the solvent, the product remains behind as a colorless to slightly yellow oil. The instant esters dissolve in most customary solvents. Such products can for the most part be purified by distillation.

As already mentioned above, the instant active compounds are distinguished by outstanding insecticidal properties. Such compounds possess, at the same time, only a low phytotoxicity and a concomitantly low mammalian toxicity. For this reason, the active compounds according to the present invention can be used with markedly good success in crop protection endeavors and in the protection of stored products, as well as in hygiene protection practices, for the control of noxious sucking and biting insects and Diptera. In addition to this, some of the instant active compounds possess considerable fungitoxic and nematocidal potency.

To the sucking insects contemplated herein there belong, in the main, aphids, (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptetra) such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frungiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (Aedes aegypti), the northern house mosquito (*Culex pipiens*) and the malaria mosquito (*Anopheles stephensi*); and the like.

With the mites (Acari) contemplated herein there are classed, in particular, the spider mites (Tetranychidea) such as the two-spotted spider mite (*Tetranychus telarius=Tetranychus althaeae* or *Tetranychus urticae*) and the European red mite (*Paratetranychus pilosus=Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.10–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates method of selectively killing, combating or controlling pests, e.g. arthropids, i.e. insects and acarids, and especially soil insects, and more particularly methods of combating at least one of insects and acarids which comprise applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is then diluted with water to the desired final concentration.

Cabbage leaves (*Brassica oleracea*) are sprayed with the preparation of the given active compound until dew moist and then infested with caterpillars of the diamond-back moth (*Plutella maculipennis*).

After the specified period of time, the degree of destruction is determined as a percentage: 100% means that all the caterpillars are killed, whereas 0% means that none of the caterpillars are killed.

The particular active compounds tested, their concentrations, the evaluation time and the results obtained can be seen from the following Table 1.

TABLE 1

| Active compound | Concentration of active compound in percent | Degree of destruction in percent after 3 days |
|---|---|---|
| (A) $[(CH_3)_2CH-O]_2\overset{O}{\overset{\|}{P}}-S-CH_2-CCl_3$ (known) | 0.01 | 0 |
| ($2_1$) $(C_2H_5O)_2\overset{S}{\overset{\|}{P}}-S-\underset{\underset{Cl}{\|}}{CH}-CHCl_2$ | 0.01 | 100 |
| ($3_1$) $\underset{C_2H_5O}{\overset{C_2H_5}{\diagdown}}\overset{S}{\overset{\|}{P}}-S-\underset{\underset{Cl}{\|}}{CH}-CHCl_2$ | 0.01<br>0.001 | 100<br>100 |
| ($1_2$) $(CH_3O)_2\overset{S}{\overset{\|}{P}}-S-\underset{\underset{Cl}{\|}}{CH}-CHCl_2$ | 0.01<br>0.001 | 100<br>90 |

EXAMPLE 2

Drosophila test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concenrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melanogaster*) and covered with a glass plate.

After the specified period of time, the degree of destruction is determined as a percentage: 100% means that all the flies are killed; whereas 0% means that none of the flies are killed.

The particular active compounds tested, their concentrations, the evaluation time and the degree of destruction can be seen from the following Table 2.

TABLE 2
(Plant-damaging insects)

| Active compound | Concentration of active compound in percent | Degree of destruction in percent after 24 hours |
|---|---|---|
| (A) $[(CH_3)_2CH-O]_2\overset{O}{\overset{\|}{P}}-S-CH_2-CCl_3$ (known) | 0.1<br>0.01 | 100<br>0 |
| ($2_2$) $(C_2H_5O)_2\overset{S}{\overset{\|}{P}}-S-\underset{\underset{Cl}{\|}}{CH}-CHCl_2$ | 0.1<br>0.01<br>0.001<br>0.0001 | 100<br>100<br>100<br>90 |
| ($1_3$) $(CH_3O)_2\overset{S}{\overset{\|}{P}}-S-\underset{\underset{Cl}{\|}}{CH}-CHCl_2$ | 0.1<br>0.01<br>0.001 | 100<br>100<br>100 |

EXAMPLE 3

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the preparation of the given active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 3.

TABLE 3

(Plant-damaging mites)

| Active compound | Concentration of active compound in percent | Degree of destruction in percent after 48 hours |
|---|---|---|
| (A) $[(CH_3)_2CH-O-]_2\overset{O}{\underset{\|}{P}}-S-CH_2-CCl_3$ (known) | 0.1 | 0 |
| (4₁) $(CH_3O-CH_2-CH_2-O)_2\overset{S}{\underset{\|}{P}}-S-CHCl-CHCl_2$ | 0.1 | 85 |
| (5₁) $(CH_3-CH_2-CH_2-O)_2\overset{S}{\underset{\|}{P}}-S-CHCl-CHCl_2$ | 0.1 | 80 |
| (3₂) $\begin{array}{c}C_2H_5\\ \diagdown\\ C_2H_5O\end{array}\overset{S}{\underset{\|}{P}}-S-CHCl-CHCl_2$ | 0.1 | 70 |

EXAMPLE 4

Soil insects outdoors test/duration of effect

Test insect: *Diabrotica balteata*
Solvent: 3 parts by weight acetone
Emulsifier: 1 part by weight alkylaryl polyglycol ether To product a suitable preparation of the particular active compound, 1 part by weight of such active compound is mixed with the stated amount of solvent, the stated amount of emulsifier is added hereto, and the resulting concentrate is diluted with water to the desired final concentration.

The preparation of the given active compound is applied outdoors to small plots of 1 square meter in size and worked in to a depth of about 10 cm.

At intervals of 14 days, soil samples are taken and infested with the test insects. After 48 hours, in each case the number of living and dead insects is determined and from this the degree of effectiveness is calculated. The degree of effectiveness is 100% when all the test insects have been destroyed; whereas it is 0% when exactly as many test insects are still alive as in the case of the control.

The particular active compounds tested, the amount applied, and the results obtained can be seen from the following Table 4.

TABLE 4

Soil insects outdoors test/duration activity (Diabrotica)

| Active compound, 1 lb./acre | Degree of effectiveness in percent in days (d) after application | | | | | | |
|---|---|---|---|---|---|---|---|
| | 7ᵈ | 15ᵈ | 30ᵈ | 45ᵈ | 60ᵈ | 90ᵈ | 120ᵈ |
| (B) $\begin{array}{c}C_2H_5O\\ \diagdown\\ C_2H_5O\end{array}\overset{S}{\underset{\|}{P}}-O-\langle\text{Cl}\rangle-Cl$ (known) | 100 | 100 | 100 | 50 | 30 | 0 | 0 |
| (2₂) $\begin{array}{c}C_2H_5O\\ \diagdown\\ C_2H_5O\end{array}\overset{S}{\underset{\|}{P}}-S-CHCl-CHCl_2$ | 100 | 100 | 100 | 100 | 100 | 70 | 30 |
| (3₃) $\begin{array}{c}C_2H_5\\ \diagdown\\ C_2H_5O\end{array}\overset{S}{\underset{\|}{P}}-S-\underset{\underset{Cl}{\|}}{CH}-CHCl_2$ | 100 | 100 | 100 | 100 | 100 | 100 | 15 |

EXAMPLE 5

Critical concentration test/soil insects

Test insect: fly maggots in the soil
Solvent: 3 parts by weight acetone
Emulsifier: 1 part by weight alkylaryl polyglycol ether To produce a suitable preparation of the particular active compound, 1 part by weight of such active compound is mixed with the stated amount of solvent, the stated amount of emulsifier is added thereto, and the resulting concentrate is diluted with water to the desired final concentration.

The preparation of the given active compound is intimately mixed with the soil. The concentration of the given active compound in the preparation is of practically no importance; only the amount by weight of active compound per unit volume of soil, which is given in p.p.m., e.g. mg./l., is decisive. The soil is filled into pots, and the pots are left to stand at room temperature.

After 24 hours, the test insects are put into the treated soil, and after a further 48 hours the degree of effectiveness of the active compound is determined as a percentage by counting the dead and living test insects. The degree of effectiveness is 100% when all the test insects have been killed; whereas it is 0% when exactly as many test insects are still alive as in the case of the control.

The particular active compound tested, the amounts applied, and the results obtained can be seen from the following Table 5.

pound is mixed with the stated amount of solvent, the stated amount of emulsifier is added thereto, and the resulting concentrate is diluted with water to the desired final concentration.

The preparation of the given active compound is intimately mixed with soil which is heavily infested with the test nematodes. The concentration of the given active compound in the preparation is of practically no importance; only the amount of active compound per unit volume of soil, which is given in p.p.m., is decisive. The soil is filled into pots, lettuce is sown in and the pots are kept at a greenhouse temperature of 27° C.

After 4 weeks, the lettuce roots are examined for infestation with nematodes, and the degree of effectiveness of the given active compound is determined as a percent-

TABLE 5

Critical concentration test (fly maggots in the soil)

| Active compound | Degree of effectiveness in percent with applied amounts of— | | | | | |
|---|---|---|---|---|---|---|
| | 40 p.p.m. | 20 p.p.m. | 10 p.p.m. | 5 p.p.m. | 2.5 p.p.m. | 1.25 p.p.m. |
| (B) $(C_2H_5O)_2P(S)-O-C_6H_3Cl_2$ (known) | 100 | 80 | 25 | | | |
| (3₁) $(C_2H_5)(C_2H_5O)P(S)-S-CH(Cl)-CHCl_2$ | 100 | 100 | 100 | 100 | 98 | |
| (6₁) $((CH_3)_2CH-O)_2P(S)-S-CH(Cl)-CHCl_2$ | 100 | 100 | 100 | 100 | 98 | 30 |
| (5₁) $(CH_3-CH_2-CH_2-O)_2P(S)-S-CH(Cl)-CHCl_2$ | 100 | 100 | 80 | 25 | | |
| (2₁) $(C_2H_5O)_2P(S)-S-CHCl-CHCl_2$ | 100 | 50 | | | | |

EXAMPLE 6

Critical concentration test

Test nematode: *Meloidogyne incognita*
Solvent: 3 parts by weight acetone
Emulsifier: 1 part by weight alkylaryl polyglycol ether To produce a suitable preparation of the particular active compound, 1 part by weight of such active comage. The degree of effectiveness is 100% when infestation is completely avoided; whereas it is 0% when the infestation is exactly the same as in the case of the control plants in untreated soil which has been infested in the same manner.

The particular active compounds tested, the amounts applied, and the results obtained can be seen from the following Table 6.

TABLE 6.—CRITICAL CONCENTRATION TEST

Root gall nematodes—*Meloidogyne incognita*

| Active compound | Degree of effectiveness in percent with applied amounts of— | | | | |
|---|---|---|---|---|---|
| | 40 p.p.m. | 20 p.p.m. | 10 p.p.m. | 5 p.p.m. | 2.5 p.p.m. |
| (B) $(C_2H_5O)_2P(S)-O-C_6H_3Cl_2$ (known) | 98 | 80 | 50 | | |
| (3₁) $(C_2H_5)(C_2H_5O)P(S)-S-CH(Cl)-CHCl_2$ | 100 | 100 | 97 | 90 | 25 |

The following further examples are set forth to illustrate, without limitation, the manner of producing the instant compounds according to the present invention.

EXAMPLE 7

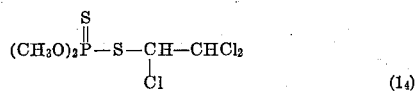
(14)

To a solution of 32 g. (0.25 mol) thiophosphorus acid-O,O-dimethylester dissolved in 50 ml. methylene chloride, there are added dropwise at 10° C., with stirring, 50 g. (0.25 mol) 1,2,2-trichloro-ethane-sulfenic acid chloride dissolved in 50 ml. methylene chloride. After combining the two reactants stirring is continued for half an hour at 20° C. and the mixture is then poured into ice water. The solution is washed neutral with dilute solution of sodium bicarbonates and dried over sodium sulfate. The solvent is then distilled off under reduced pressure. The O,O-dimethyl - S - (1,2,2-trichloro-ethyl)thionothiolphosphoric acid ester remaining behind is distilled. Boiling point: 134° C./1 mm. Hg; refractive index: $n_D^{20} = 1.5572$; yield: 52 g. (71.5% of the theory).

Analysis.—$C_4H_8O_2Cl_3PS_2$; (289.57). Calc. (percent): P, 10.70; S, 22.15. Found (percent): P, 10.43; S, 21.55.

EXAMPLE 8

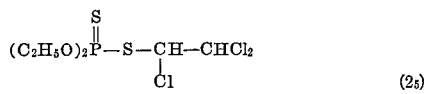
(2₅)

38.5 g. (0.25 mol) thiophosphorous acid-O,O-diethyl ester are dissolved in 50 ml. carbon tetrachloride and cooled to 10° C. Dry air is blown through the solution and, simultaneously, a solution of 50 g. (0.25 mol) 1,2,2-trichloro-ethylsulfenic acid chloride in 50 ml. carbon tetrachloride is added dropwise. After completion of the reaction, the mixture is stirred for half an hour at 20° C. The reaction solution is then washed neutral with dilute solution of sodium bicarbonate and dried over sodium sulfate. After the solvent has been distilled off, the O,O-diethyl - S - (1,2,2-trichloro-ethyl)-thionothiolphosphoric acid ester is obtained as a yellow oil which is distilled for further purification. Boiling point: 136° C./1 mm. Hg; refractive index: $n_D^{20}=1.5388$; yield: 64 g. (83% of the theory).

Analysis.—$C_6H_{12}Cl_3S_2P$; (317.63). Calc. (percent): P, 9.75; S, 20.19. Found (percent): P, 9.51; S, 19.57.

EXAMPLE 9

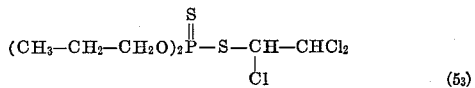
(5₃)

To a solution of 36.2 g. (0.2 mol) thiophosphorous acid-O,O-di-n-propyl ester in 100 ml. methylene chloride, there is added dropwise at 10 to 20° C. a solution of 40 g. (0.2 mol) 1,2,2-trichloro-ethyl-sulfenic acid chloride in 50 ml. methylene chloride. The mixture is further stirred for ¼ hour at room temperature and then poured into ice water. Washing neutral is effected with dilute solution of sodium hydroxide, and the solution is dried over sodium sulfate. The solvent is then distilled off under reduced pressure. The O,O-di-n-propyl-S-(1,2,2-trichloroethyl)-thionothiolphosphric acid ester remaining behind as an oil is distilled under greatly reduced pressure. Boiling point: 138° C./0.01 mm. Hg; refractive index: $n_D^{20}= 1.5221$; yield: 55 g. (82% of the theory).

Analysis.—$C_8H_{16}O_2Cl_3S_2P$; (345.68). Calc. (percent): P, 8.96; S, 18.55; Found (percent): P, 9.45; S, 17.18.

EXAMPLE 10

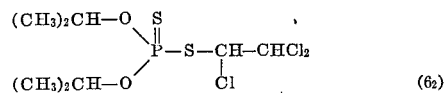
(6₂)

The preparation of the above compound, i.e. O,O-di-iso-propyl-S-(1,2,2 - trichloro-ethyl)-thionothiol phosphoric acid ester, takes place according to the process described in the preceding example. Boiling point: 120° C./0.01 mm. Hg; refractive index: $n_D^{20}= 1.5181$; yield: 84% of the theory.

Analysis.—$C_8H_{16}O_2Cl_3PS_2$; (345.68). Calc. (percent): P, 8.96; S, 18.55. Found (percent): P, 9.04; S, 17.84.

EXAMPLE 11

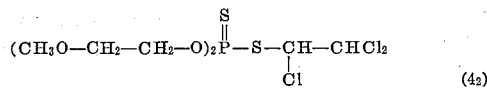
(4₂)

The preparation of the above compound, i.e. O,O-di-(β-methoxy-ethyl) - S - (1,2,2-trichloro-ethyl)-thionothiol phosphoric acid ester, takes place according to the process described in Example 9.

Refractive index: $n_D^{20}=1.5329$; yield: 90% of the theory.

Analysis.—$C_8H_{16}O_4Cl_3S_2P$; (377.68). Calc. (percent): Cl, 28.16; P, 8.20; S, 16.98. Found (percent): Cl, 28.55; P, 8.26; S, 16.79.

EXAMPLE 12

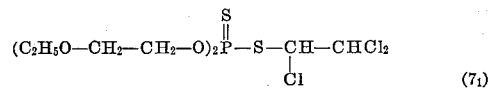
(7₁)

The preparation of the above compound, i.e. O,O-di-(β-ethoxy-ethyl) - S - (1,2,2-trichloro-ethyl)thionothiol phosphoric acid ester, takes place according to the process described in Example 9. Melting point: 72° C.; yield: 84% of the theory.

Analysis.—$C_{10}H_{20}O_4Cl_3S_2P$; (405.73). Calc. (percent): P, 7.64; S, 15.80. Found (percent): P, 7.97; S, 16.03.

EXAMPLE 13

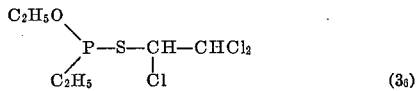
(3₆)

34.5 g. (0.25 mol) ethane-thiophosphonous acid-O-ethyl ester are dissolved in 100 ml. methylene chloride, and a solution of 50 g. (0.25 mol) 1,2,2-trichloroethyl-sulfenic acid in 50 ml. methylene chloride is added dropwise thereto at 10 to 20° C. After completion of the addition, stirring is effected for a further 15 minutes at room temperature and the reaction solution is then poured into ice water. The organic phase is washed neutral with dilute solution of sodium hydroxide and dried over sodium sulfate. After the solvent has been distilled off, the O-ethyl-S - (1,2,2 - tri-chlori-ethyl)-ethane-thionothiolphosphonic acid ester remains behind as an oil which can be distilled. Boiling point: 118° C./0.01 mm. Hg; refractive index: $n_D^{20}=1.5600$; yield: 56 g. (74% of the theory).

Analysis.—$C_6H_{12}OCl_3S_2P$; (301.63). Calc. (percent): P, 10.27; S, 21.26. Found (percent): P, 9.56; S, 21.46.

It will be realized that all of the foregoing compounds contemplated by the present invention possess the desired selective pesticidal, especially arthropodicidal, i.e. insecticidal and acaricidal, properties for combating insects and acarids, and that such compounds have a low phytotoxicity and a correspondingly low mammalian toxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may

What is claimed is:

1. Phosphorus acid ester of the formula

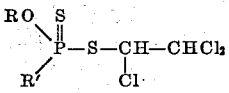

in which R is selected from the group consisting of alkyl of 1–5 carbon atoms and alkoxyalkyl of 2–6 carbon atoms, and R' is selected from the group consisting of alkyl of 1–4 carbon atoms, and alkoxyalkoxy of 2–6 carbon atoms.

2. Compounds according to claim 1 wherein R is selected from the group consisting of $C_{1-4}$ alkyl and $C_{1-2}$ alkoxy-$C_{1-4}$ alkyl, and R' is selected from the group consisting of $C_{1-3}$ alkyl, and $C_{1-2}$ alkoxy-$C_{1-4}$ alkoxy.

3. Compound according to claim 1 wherein R is selected from the group consisting of $C_{1-3}$ alkyl and $C_{1-2}$ alkoxy-$C_{1-3}$ alkyl, and R' is selected from the group consisting of $C_{1-2}$ alkyl, and $C_{1-2}$ alkoxy-$C_{1-3}$ alkoxy.

4. Compound according to claim 1 wherein such compound is ethyl-O-ethyl - S - (1,2,2-trichloro-ethyl)-thionothiol phosphonic acid ester of the formula

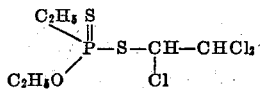

5. Compound according to claim 1 wherein such compound is O,O-di-(β-methoxy-ethyl) - S - (1,2,2-trichloro-ethyl)-thionothiol phosphoric acid ester of the formula

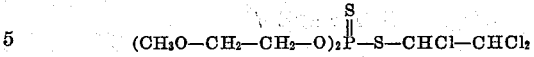

6. Compound according to claim 1 wherein such compound is O,O-di(β-ethoxy-ethyl)-S-(1,2,2-trichloro-ethyl)-thionothiol phosphoric acid ester of the formula

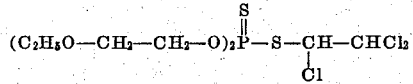

References Cited

UNITED STATES PATENTS

| | | | |
|---|---|---|---|
| 3,093,536 | 6/1963 | Loeffler | 260—961 X |
| 2,928,863 | 3/1960 | Schrader | 260—963 |
| 3,184,377 | 5/1965 | Hensel et al. | 260—963 X |

LEWIS GOTTS, Primary Examiner

A. H. SUTTO, Assistant Examiner

U.S. Cl. X.R.

260—961; 963; 424—217, 222, 225

UNITED STATES PATENT OFFICE
CERTIFICATE OF CORRECTION

Patent No. 3,732,341  Dated May 8, 1973

Inventor(s) Wilhelm Sirrenberg et al

It is certified that error appears in the above-identified patent and that said Letters Patent are hereby corrected as shown below:

Col. 1, line 18
   "phosponic" should be -- phosphonic --.

Col. 3, line 15
   "$\underline{HCl}$." should be -- $\underline{HCl}_\rightarrow$ Col. 3, line 20

" -S-CH- " should be --   -S-CH-   --.
        |                       |
        C                       Cl Col. 4, line 23
   "243391i" should be -- 243391 --.

Col. 8, line 70
   the last entry "90" should be -- 98 --.

Col. 12, Table 5
   For compound $(3_4)$, under "1.25 p.p.m.", there should be inserted -- 30 --.

Col. 14, line 43
   after "acid" insert --chloride--.

Col. 14, line 50
   "-tri-chlori-ethyl)" should be -- -tri-chloro-ethyl)--.

Signed and sealed this 27th day of November 1973.

(SEAL)
Attest:

EDWARD M. FLETCHER, JR.
Attesting Officer

RENE D. TEGTMEYER
Acting Commissioner of Patents